United States Patent [19]

Kordana

[11] Patent Number: 5,118,184
[45] Date of Patent: Jun. 2, 1992

[54] TRANSIT FOR ESTABLISHING 90 DEGREE ANGLES
[76] Inventor: Zigmond J. Kordana, 8½ Powers St., Adams, Mass. 01220
[21] Appl. No.: 615,922
[22] Filed: Nov. 20, 1990
[51] Int. Cl.⁵ .............................................. G01B 11/26
[52] U.S. Cl. .................................. 356/140; 356/144; 33/276
[58] Field of Search ............... 356/138, 140, 142, 144, 356/145, 146; 33/276–280, 285

[56] References Cited
U.S. PATENT DOCUMENTS 857,688  6/1907  Thorburn ........................... 356/144
1,696,508  12/1928  Thorburn ........................... 356/144

Primary Examiner—F. L. Evans
Attorney, Agent, or Firm—Terry M. Gernstein

[57] ABSTRACT

A transit includes two identical transit elements oriented at 90° with respect to each other. Each transit element includes an objective end and a viewing end and be focused on a distant point. The transit is mounted on top of an intersection of two elements, and the elements can be moved to be at a right angle with respect to each other. Once the right angle is set, other portions of a polygonaly figure, such as a rectangle or a square, can be set.

7 Claims, 4 Drawing Sheets

TRANSIT FOR ESTABLISHING 90 DEGREE ANGLES

TECHNICAL FIELD OF THE INVENTION

The present invention relates to the general art of measuring and testing, and to the particular field of optical instruments used by engineers and surveyors.

BACKGROUND OF THE INVENTION

The building industry has many uses of elements which must be at right angles with respect to each other. For example, a footing, or the like, generally must have adjacent walls thereof at right angles with respect to each other. Footings or other such concrete elements are often formed by pouring the concrete into a wood form, and removing the form after the concrete has hardened. The shape of the wood form determines the ultimate shape of the concrete element.

Often, the forms used in concrete work include corners, which must be right angle corners. These forms are generally fabricated by carpenters or other workmen on the job site. The right angle corners are formed by measuring distances and computing relationships and then attaching adjacent elements, such as walls or the like, together, as by nailing or the like.

Due to terrain or other such exigencies, it is often difficult to define perfect right angles for various elements. This is especially true if the wood form is used in a trench or other such dugout area. The defining of proper right angles under such conditions may be difficult, time consuming and still not accurate.

While footings, and wood forms have been used as examples, it is understood that those skilled in the art will know of a plethora of other such structures and conditions subject to the same problems. Therefore, no limitation is intended by the use of such example.

Therefore, there is a need for a means for establishing right angles, and which can be easily set up and used, even in difficult situations, and which will still set exact right angles in an easy and expeditious manner.

OBJECTS OF THE INVENTION

It is a main object of the present invention is to provide a means for establishing right angles.

It is another object of the present invention to provide a means for establishing right angles, and which can be easily set up and used.

It is another object of the present invention to provide a means for establishing right angles, and which can be easily set up and used, even in difficult situations.

It is another object of the present invention to provide a means for establishing right angles, and which can be easily set up and used, even in difficult situations, and which will still set exact right angles in an easy and expeditious manner.

SUMMARY OF THE INVENTION

These, and other, objects are achieved by 90° transit which includes two transits mounted on a turntable and a base which can be releasably mounted at an intersection of two adjacent elements, such as walls of a wood form used in concrete work, or the like. The transits are oriented at a 90° angle with respect to each other, and, in the preferred embodiment of the invention, are identical to each other for easy replacement and repair. Using the transits, adjacent elements can be oriented at the exact 90° angle with respect to each other. Once an initial right angle has been established, all other angles can be set to the required 90° by simple linear measurements and marking techniques. Therefore, even in difficult terrain, such as inside a trench, or the like, a perfect rectangle or square can be easily established. Likewise, any geometric shape including at least one right angle can easily be defined using the device of the present invention.

The device can use line of sight or lasers or other such light emitting elements as suitable.

BRIEF DESCRIPTION OF THE DRAWING FIGURES

DETAILED DESCRIPTION OF THE PREFERRED EMBODIMENT OF THE INVENTION

Figure 1:
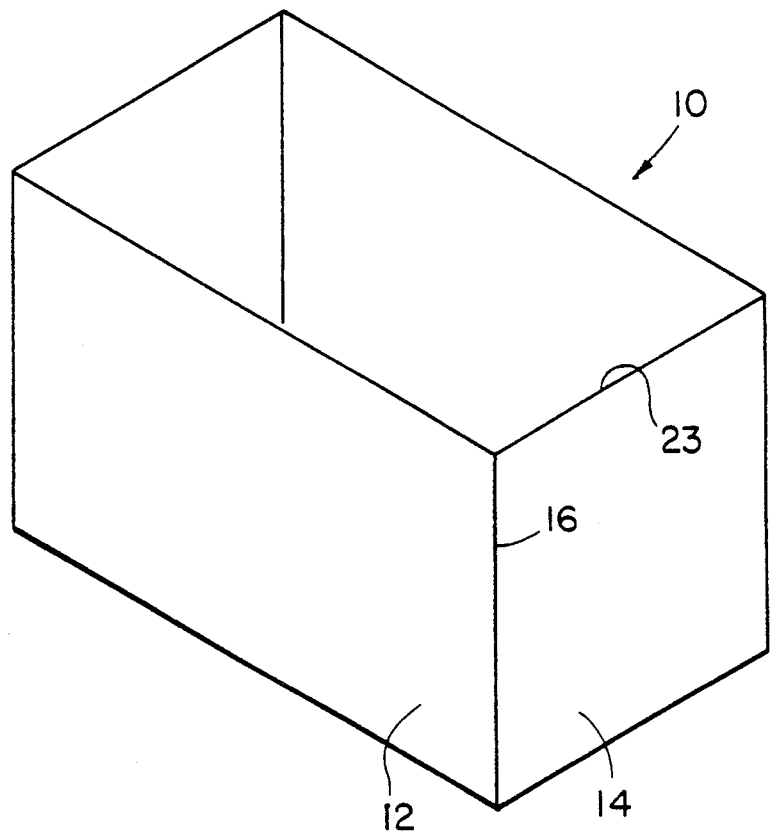
FIG. 1 is a perspective view of a form which can be used in concrete work.

Shown in FIG. 1 is a form 10 such as might be used in containing concrete while such concrete hardens. This form is generally fabricated of wood in situ by workmen. The form is generally fabricated by nailing, or otherwise fastening adjacent walls, such as walls 12 and 14 together at corners 16. The concrete is then poured into the form, and allowed to harden. Once the concrete has hardened, the form is removed.

Many forms are square or rectangular in shape, and thus the corners 16 are right angles with the adjacent walls, such as walls 12 and 14 being oriented at 90° with respect to each other. Many times, the right angle is formed by measuring along the adjacent walls and applying various relationships, or the like, to orient the walls with respect to each other in a manner which establishes the desired right angle.

However, as mentioned above, due to rough terrain or the like, it may be difficult to define all of the corners 16 in an easy and expeditious manner.

Figure 2:
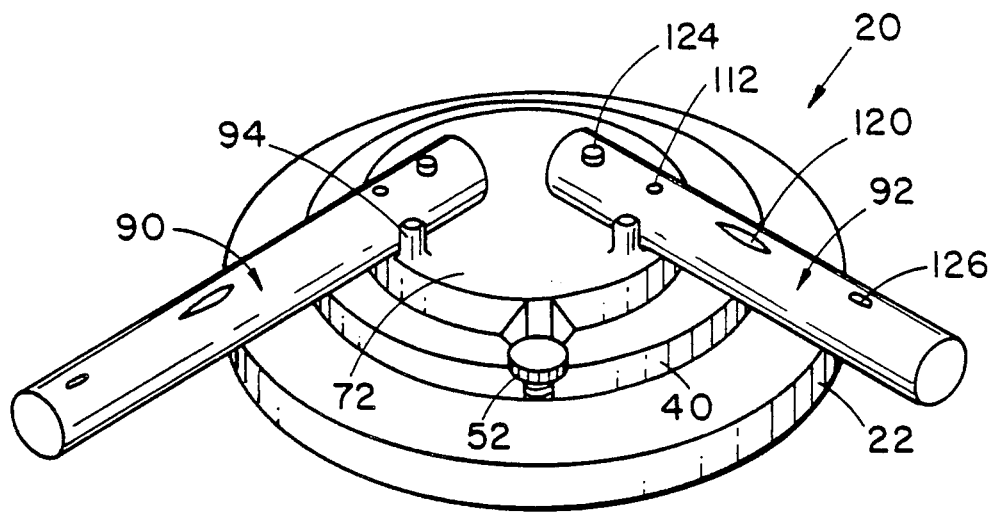
FIG. 2 is a perspective view of a 90° transit embodying the present invention.
Figure 3:
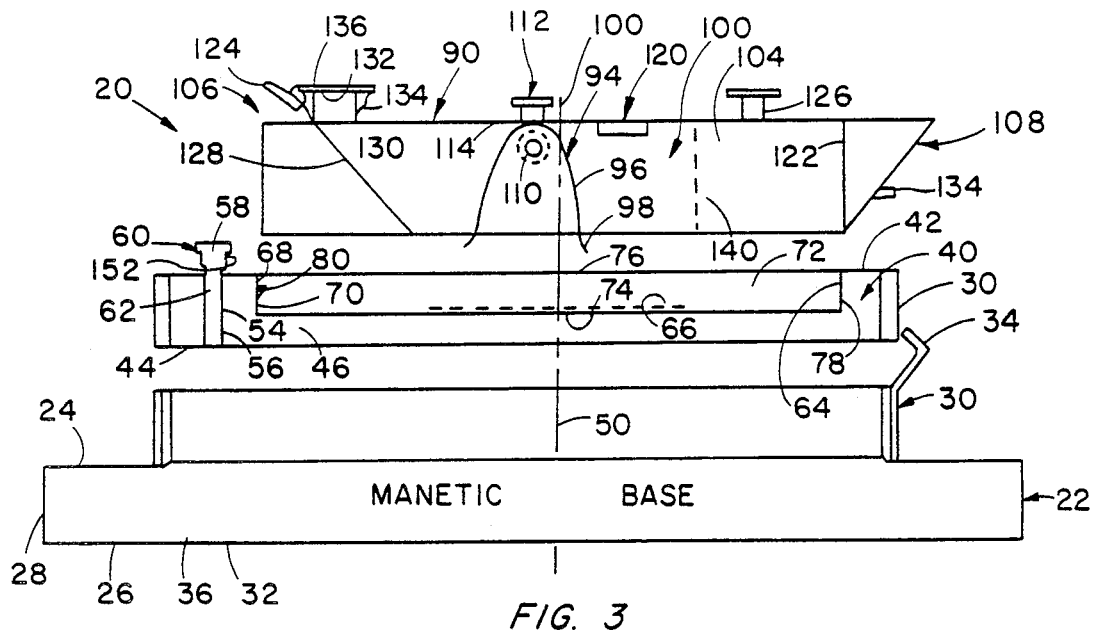
FIG. 3 is an exploded side elevational view of the transit.
Figure 4:
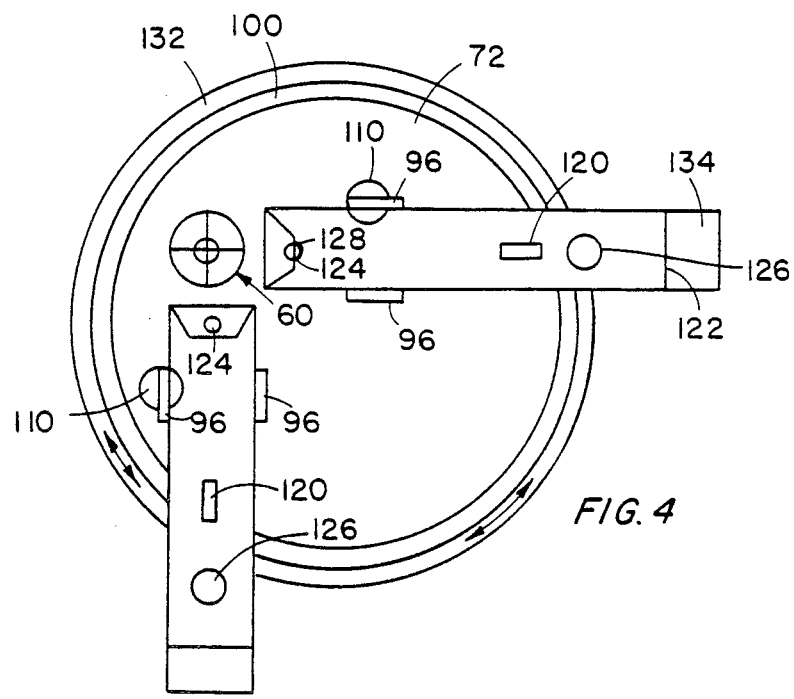
FIG. 4 is a top plan view of the transit.

The 90° transit 20 shown in FIGS. 2, 3 and 4 permits accurate right angles to be established in an easy and expeditious manner without the need of formulas, relationships or the like. The transit 20 is simply mounted on two adjacent elements, and one or both of the elements moved to locations indicated by the transit 20. Once the elements are in the orientation indicated by the transit 20, these elements will be at exactly 90° with respect to each other.

The transit 20 includes a main base 22 which is magnetic so it can be easily mounted on top of two adjacent walls, such as walls 12 and 14 using the metal fasteners, such as nails or the like, generally used to attach such walls together. If necessary, extra nails can be driven into the top rim 23 of either or each wall in order to provide the metallic element required to attach the magnetic base 22 to one or both of the elements. The base 22 includes an upper surface 24 and a lower surface 26 connected together by a sidewall 28, and can be circular in peripheral shape. A tubular mount 30 extends upwardly from the base top surface 24 and includes a hollow interior volume extending from the base top surface 24 to an upper rim 30. A support element 32 can be located inside the tubular element 30. The tubular element 30 also includes a screw thread, indicated at 34 for a purpose that will be understood from the ensuing disclosure. The magnetic base further includes a sight bore 36 which will be positioned superadjacent to a corner such as corner 16 when the transit 20 is in position. The bore 36 is sized to circumscribe the corner whereby the corner can be seen through the stationary base sight bore from above the top surface 24 when the transit is in position.

The transit 20 further includes a stationary base 40 which fits into the tubular element. The stationary base 40 is cylindrical in shape and includes a top surface 42 and a bottom surface 44 connected together by a sidewall 46. The stationary base is sized to fit into the tubular element, and includes a screw thread on the sidewall thereof which cooperates with the screw thread 34 to position the stationary base in the tubular element. The stationary base 40 has a longitudinal axis that is positioned on the longitudinal axis 50 of the tubular element and which extends from the stationary base top surface to the stationary base bottom surface.

The stationary base further includes an optical plummet sight unit 52 mounted therein to be collinear with the center longitudinal axis of the stationary base sight bore 36. The sight unit includes a tubular element 54 extending through the stationary base from the top surface 42 to the bottom surface 44 and which has an objective lens 56 in a lower end thereof adjacent to the stationary base bottom surface for focusing on the corner 16. A viewing lens 58 is located at a top end of the viewing unit adjacent to an eyepiece 60. The viewing lens is movably mounted on the tube 54 and is moved by rotating the eyepiece clockwise or counterclockwise. Rotation of the eyepiece moves the viewing lens towards or away from the objective lens whereby the sight unit 52 can be focused on the corner 16. A crosshair target 62 is mounted in the tube 54 between the eyepiece and the objective lens and is superimposed on the corner 16 when that corner is viewed through the eyepiece and through the bore 36. The transit magnetic base can be moved into an exact position using the eyepiece and the crosshair target 62 whereby the transit will be positioned with respect to the corner in an exact and precise location.

The stationary base further includes a cylindrical cavity 64 defined therein. The cavity extends from a bottom surface 66 to the stationary base top surface 42 and has a sidewall 68 defined by the stationary base adjacent to the cavity. A key 70 is mounted on the sidewall 68 and extends into the cavity. The key can be brass and serves a purpose which will be understood from the following disclosure.

A turntable 72 is rotatably mounted on the stationary base in the cavity and includes a bottom surface 74 which rests on the cavity bottom wall 66 and a planar top surface 76 which is coplanar with the stationary base top surface 42. A sidewall 78 connects the turntable top and bottom surfaces together. A keyway 80 is defined in the turntable sidewall and receives the key 70 to rotatably lock the turntable to the stationary base. The turntable can be rotated in either the clockwise or the counterclockwise direction with respect to the stationary base.

Two identical transit units 90 and 92 are mounted on the turntable 72 for rotation therewith. The transit units are identical and thus only one unit will be discussed. The transit unit 90 includes two mounting means, such as mounting means 94 having a U-shaped bracket 96 fixed at a lower end 98 thereof to the turntable and having a curved top end 100.

Each transit unit further includes a transit sight element, such as element 102. The element 102 includes a tubular housing 104 having a viewing end 106 and an objective end 108 with a longitudinal axis connecting the viewing and objective ends together and being oriented perpendicular to the central longitudinal axis 50. A mounting screw 110 is fixed to the tubular housing 104 to engage the mounting means bracket 96 to move along the longitudinal axis 50 to move the transit element up and down along that axis 50. The mounting screw 110 includes a screw head 112 located on top of the tubular housing 104. The mounting screw also includes a screw threaded body 114 which cooperates with an internally threaded bore in the element 110 to draw that element up or down depending on the direction of rotation of the screw element 112. Since the element 112 is fixed to the tubular housing 104 and the element 110 is fixed to the bracket 96, which is fixed to the turntable 72, movement of the element will move the housing up or down. This will permit the housing to be leveled whereby accurate sighting will be possible. A leveling bubble element 120 is located in the housing 104 for assisting a user in leveling the transit element. It is noted that there are two brackets 96 and only one leveling screw 112 since only one such element is required. However, if desired, two mounting brackets can be used, one on each side of the tubular housing.

The transit element further includes an optical system which has an objective lens 122 movably mounted in the tubular housing at one end of that housing and a viewing lens system 124 mounted at the other end of the housing. The objective lens is moved along the longitudinal centerline of the housing toward or away from the viewing system by a cooperating screw thread system having a focus screw 126 on the top of the housing. Rotation of the focus screw moves the objective lens along the longitudinal axis of the housing whereby focusing of the transit element is possible.

The viewing system 124 includes a mirror 128 mounted in the tubular housing to be oriented at a 45° angle with respect to both the longitudinal centerline of the tubular housing 104 and with respect to a plane containing the turntable top surface 76. A distant image is thus focused on the mirror by the objective lens 122. This focused image is viewed via the viewing system 124 which includes an objective lens 130 and a viewing lens 132 mounted on a tubular housing 134. The housing 134 in movable in the tubular housing 102 toward and away from the mirror 128 whereby the image formed on that mirror by the objective lens 122 can be viewed via eyepiece 136 in a clear and focused manner.

A crosshair target 140 is located internally of the housing 102 to be interposed between the objective lens 122 and the mirror 128 whereby the mirror has an image of the crosshair target thereon. The image of the distant viewing point is superimposed over the image of the crosshair target 140 so the exact location of the transit and the distant point can be viewed. This permits the user to orient the transit in the exact manner necessary to precisely establish a 90° angle.

Figure 5:
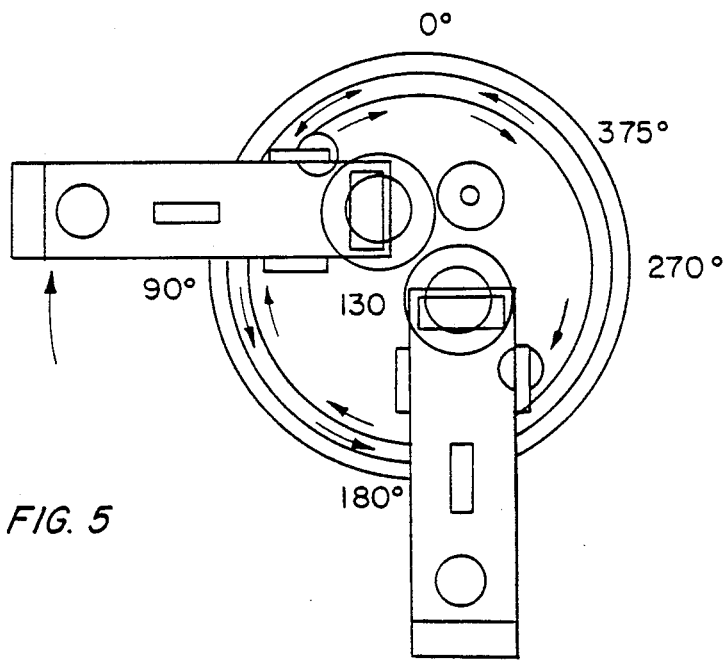
FIG. 5 is a top plan view of another form of the transit.

One form of the transit unit is shown in FIG. 4 in which one transit element is positioned parallel to a 90°-270° line, and the other transit element is positioned parallel to the 0°-180° line; whereas another form of the transit unit is shown in FIG. 5 with one transit element being positioned on a line parallel to a 270°-90° line and the other transit element being positioned parallel to a 0°-180° line. Special mounts 130 can be included beneath the transit element viewing ends, and radial division lines 132 can be located on both the turntable and on the stationary base so exact angular measurements can be read. Sunshades 134 can also be included if desired.

Figure 6:
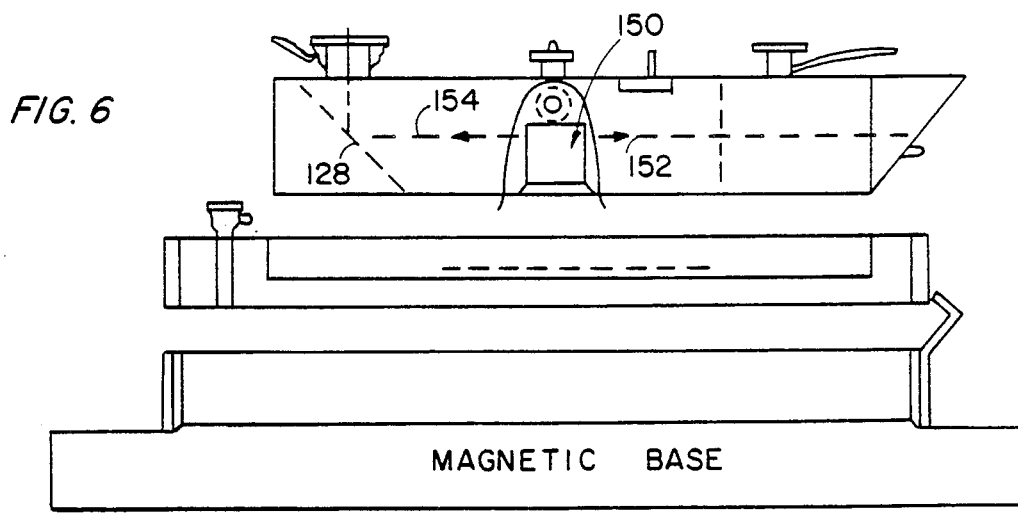
FIG. 6 is an exploded side elevational view of the transit in which a laser is used to establish a line of sight.

An alternative form of the transit system is shown in FIG. 6 in which a laser unit 150 emits a pair of collinear beams 152 and 154 toward the distant object and toward the mirror 128 respectively. Using the laser unit, a user can locate the object and establish the right angle with extreme precision.

Figure 7:
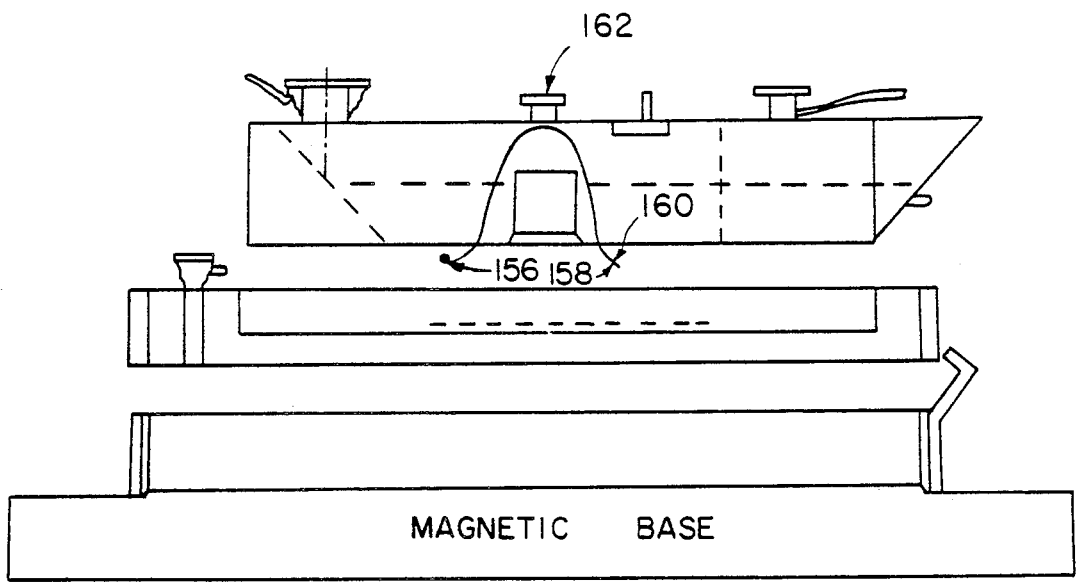
FIG. 7 is an exploded side elevational view of a transit showing an alternative form of a mechanism used to level each transit.

An alternative form of the leveling system is shown in FIG. 7 in which leveling screws 156 and 158 connect the bracket 96 to the turntable. The leveling screws 156 and 158 cooperably engage screw threaded bores defined in the turntable and include wing nuts, such as wing nut 160 on the screw 158. Rotating the wing nuts will move the bracket 96 and the tubular housing 102 is connected to the bracket by a fastener 162. Therefore, movement of the leveling screws 156 and/or 158 will move the transit element housing 102.

Figure 8:
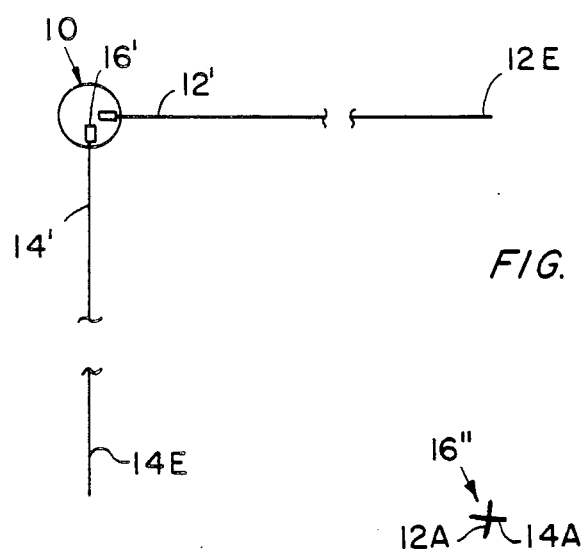
FIG. 8 is a schematic illustrating the use of the transit of the present invention.

Use of the device 20 is illustrated in FIG. 8. Two elements 12' and 14' of an overall polygonally shaped unit are shown intersecting at a corner 16'. The remainder of the unit will be erected once the 90° corner 16' is established. The device 10 is mounted on one or both of the elements 12' and 14', and the plummet viewing system 52 is used to align the device with the corner 16'. The transit elements are then used to sight down the elements 12' and 14'. Either or both of these two elements 12' and/or 14' are moved until they are both properly aligned with the crosshair targets 140 of each of the transit elements. The corner 16' is then an exact 90° corner. The lengths of element 12' and 14' are then used to establish a corner 16''. Thus, for example, a tape or string having a length of the element 14' is placed at end 12E of element 12' and an arc 14A is scribed. A tape or string having a length equal to the length of element 12' is placed at end 14E of element 14' and an arc 12A is scribed to intersect arc 14A. The intersection of the arcs 12A and 14A establishes corner 16''. If the lengths of the elements are exact, corner 16'' will also be an exact 90° corner. A perfect square or a perfect rectangle will be established. If all of the sides of the unit 10' are precut, then the scribing process is not needed. Once the corner 16' is established, the remaining sides will automatically intersect at right angles. In some cases, two units 10 can be used, or one unit 10 used and moved as required.

It is understood that while certain forms of the present invention have been illustrated and described herein, it is not to be limited to the specific forms or arrangements of parts described and shown.

I claim:

1. A transit system for establishing 90° angles comprising:

a) a magnetic base adapted to be mounted on at least one element of two intersecting elements, said base being mountable at the intersection of said two elements and including
   (1) a bottom surface,
   (2) a top surface,
   (3) a receiving tube mounted on said top surface, said receiving tube including a screw thread defined internally thereof, and
   (4) a bore defined through said base from said base top surface to said base bottom surface, said bore having a longitudinal axis extending from said base top surface to said base bottom surface and being sized and located to circumscribe the intersection of said two elements when said magnetic base is mounted adjacent to said intersection;

B) a stationary base having a bottom surface, a top surface, a sidewall connecting said stationary base bottom surface to said stationary base top surface, a screwthread defined in said sidewall and sized to threadably cooperate with said base tube screwthread and releasably coupling said stationary base to said magnetic base, a cavity defined in said stationary base to open outwardly of said stationary base top surface, and a key element mounted on said stationary base adjacent to said cavity to extend into said cavity;

C) a turntable having a bottom surface, a planar top surface, a sidewall connecting said turntable top surface to said turntable bottom surface, and a keyway defined in said turntable sidewall, said keyway being sized to slidably receive said key and rotatably coupling said turntable to said stationary base;

D) an optical plummet unit mounted on said stationary base to be axially aligned with said magnetic base bore and including an optical system having an objective lens located near said stationary base bottom surface and an eyepiece located near said stationary base top surface, and a crosshair target element mounted between said objective lens and said eyepiece for targeting said intersection and locating said stationary base in a predetermined orientation with respect to said intersection;

E) a first transit element mounting means fixed to said turntable top surface, said first transit element mounting means including an adjusting means;

F) a first transit element connected to said first transit element mounting means and including
   (1) a tubular body having a viewing end and an objective end, and a center longitudinal axis extending from said first transit element tubular body objective end to said first transit element tubular body viewing end,
   (2) a crosshair target extending at a right angle to said first transit element tubular body center longitudinal axis and being located between said first transit element viewing end and said first transit element objective end,
   (3) a mirror mounted in said first transit element tubular body viewing end and oriented at a 45° angle with respect to said first transit element tubular body center longitudinal axis and at a 45° angle with respect to a plane containing said turntable top surface when said first transit element is mounted on said turntable top surface,
   (4) a viewing system mounted said first transit element tubular body adjacent to said first transit element mirror and having an objective lens focused on said first transit element mirror and a viewing lens spaced from said first transit element viewing system objective lens, said first transit element viewing system having central axis extending from said first transit element viewing system objective lens to said first transit element viewing system viewing lens and which is oriented at a right angle to said first transit element tubular body center longitudinal axis, said first transit element viewing system being located to view said first transit element crosshair target,
  (5) an first transit element objective lens movably positioned in said first transit element objective end, said first transit element objective lens
    (a) being positioned to cooperate with said first transit element viewing system so a distant point can be viewed through said first transit element viewing system with said first transit element crosshair target being overlayed onto such distant point,
    (b) means movably mounting said first transit element objective lens to said first transit element tubular body, and
    (c) a leveling bubble element on said first transit element tubular body;
G) a second transit element mounting means fixed to said turntable top surface, said second transit element mounting means including an adjusting means; and
H) a second transit element connected to said second transit element mounting means and including
  (1) a tubular body having a viewing end and an objective end, and a center longitudinal axis extending from said second transit element tubular body objective end to said second transit element tubular body viewing end,
  (2) a crosshair target extending at a right angle to said second transit element tubular body center longitudinal axis and being located between said second transit element viewing end and said second transit element objective end,
  (3) a mirror mounted in said second transit element tubular body viewing end and oriented at a 45° angle with respect to said second transit element tubular body center longitudinal axis and at a 45° angle with respect to a plane containing said turntable top surface when said second transit element is mounted on said turntable top surface,
  (4) a viewing system mounted said second transit element tubular body adjacent to said second transit element mirror and having an objective lens focused on said second transit element mirror and a viewing lens spaced from said second transit element viewing system objective lens, said second transit element viewing system having central axis extending from said second transit element viewing system objective lens to said second transit element viewing system viewing lens and which is oriented at a right angle to said second transit element tubular body center longitudinal axis, said second transit element viewing system being located to view said second transit element crosshair target,
  (5) an second transit element objective lens movably positioned in said second transit element objective end, said second transit element objective lens
    (a) being positioned to cooperate with said second transit element viewing system so a distant point can be viewed through said second transit element viewing system with said second transit element crosshair target being overlayed onto such distant point,
    (b) means movably mounting said second transit element objective lens to said second transit element tubular body, and
    (c) a leveling bubble element on said second transit element tubular body.

2. The device defined in claim 1 wherein each transit element viewing end is located within a circumference of said turntable and each transit element objective end is located outside the circumference of said turntable.

3. The device defined in claim 2 further including radial division marks on said turntable and on said stationary base.

4. The device defined in claim 3 wherein said first transit element objective end is located adjacent to a 270° location on said turntable and said second transit element objective end is located adjacent to a 180° location on said turntable.

5. The device defined in claim 3 wherein said first transit element objective end is located adjacent to a 90° location on said turntable and said second transit element objective end is located adjacent to a 180° location on said turntable.

6. The device defined in claim 3 further including a sunshade on each transit element objective end.

7. The device defined in claim 3 further including a laser unit in each transit element, said laser element emitting a beam of light towards the mirror of each transit element and a second beam of light towards the objective lens of each transit element.

* * * * *